June 24, 1969  HISASHI KISHITAKA ET AL  3,451,769
METHOD OF PRODUCING AMMONIUM SALTS AND IRON OXIDE
FROM WASTE PICKLE LIQUOR
Filed Nov. 24, 1965

United States Patent Office 3,451,769
Patented June 24, 1969

3,451,769
METHOD OF PRODUCING AMMONIUM SALTS AND IRON OXIDE FROM WASTE PICKLE LIQUOR
Hisashi Kishitaka and Yoshihisa Shimamura, Chiba-shi, and Shinya Takata, Tsuyama-shi, Japan, assignors to Kawasaki Steel Corporation, Hyogo-ken, Japan, and Meiwa Chemical Engineering Co., Ltd., Okayama-ken, Japan, a corporation of Japan
Filed Nov. 24, 1965, Ser. No. 509,564
Int. Cl. C01c 1/24; C01g 49/08
U.S. Cl. 23—100                                11 Claims

ABSTRACT OF THE DISCLOSURE

Ammonium salts and ferroso-ferric oxide are recovered from waste pickling liquor by preoxidizing a portion of the waste pickle liquor using free oxygen and $NO_2$ gas as a catalyst and subsequently combining the preoxidized solution with the remaining unoxidized waste pickle liquor, neutralizing the resultant combination with ammonia and thereafter separating a ferroso-ferric oxide from the ammonium salts.

---

Figure 1:
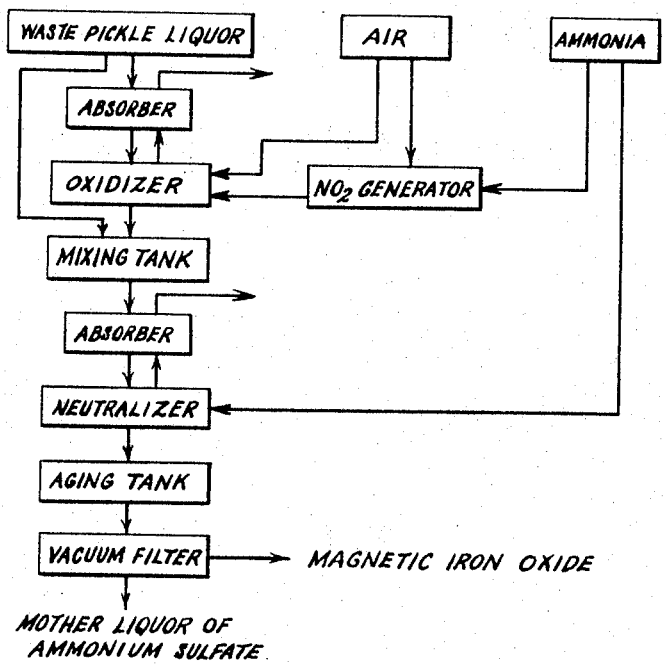

This invention relates to a method of producing pure ammonium salt and a readily separable iron oxide from a solution of a ferrous salt, particularly waste pickling liquor or liquor of similar composition, and ammonia.

Waste pickling liquor is produced from an operation whereby the oxide scale is removed from steel articles, such as sheets and will, by cleaning or pickling with sulfuric or hydrochloric acid prior to cold forming or coating with another metal. The liquor is predominantly an aqueous solution o fferrous sulfate or chloride and free sulfuric or hydrochloric acid.

A liquor of composition similar to that of waste pickling liquor is als oproduced in large volume as a by-product in the manufacture of certain pigments, especially titanium dioxide.

Many different methods of disposing of waste pickling liquor or liquors of similar composition have been developed. The most primitive method is to discharge the liquor directly into a river or the sea. Other methods include: (1) neutralizing the free acid in the liquor with lime, or some other alkaline agent, and discharging the resultant product into a stream after settling the precipitate; (2) recovering ferrous sulfate and regenerating sulfuric acid througfh a process of cooling by refrigeration or vacuum evaporation, followed by concentration by heating, treatment with solvents, or scrap neutralization; (3) separating ferrous chloride and recovering surfuric acid by treating the liquor with hydrogen chloride; (4) use of ion exchange techniques, or (5) electrolysis.

Other methods of treating waste pickling liquor utilize ammonia to obtain ammonium sulfate, and include producing iron oxide by blowing ammonia gas and air into the liquor, or by blowing ammonia and carbon dioxide int othe liquor, separating the iron carbonate from the resultant mixture and then decarburizing.

Other methods of treatment include settling iron sulfide by employing coke oven gas.

When waste pickling liquor is neutralized with ammonia, complete precipitation of the ferrous iron can not ordinarily be effected until the pH is raised above 9 and it is very difficult to filter out this precipitate. In accordance with a previous method, a rapid settling iron oxide, largely hydrated ferroso-ferric oxide, is formed which accomplishes complete precipitation of the iron in the liquor at a pH of 7.5 to 8.0. The precipitate is obtained by feeding air to the ferrous salt at the same time or after gaseous ammonia is fed thereto. This technique, however, is very complicated, requiring strict control of the processing conditions including the temperature, pH value, air dispersion, and equilibrium. Moreover, the method takes considerable time for oxidation and the extensive facilities required do not lend itself to use by the industry.

One of the objects of the present invention is to simplify the processing system of the waste pickling liquor treatment by oxidizing the ferrous ion into a ferric ion with air (or oxygen) in the acidic state in a short time by using a catalyst, proportioning the liquor involving both ions in such a ratio as to form iron oxide and neutralizing the liquor with gaseous ammonia.

Another object of the present invention is to obtain a iron oxide which can be filtered rapidly, has little mother liquor in the filtered cake, and can yield clean filtrate. The iron oxide recovered by the present technique contains little impurity, and can advantageously be sintered or pelletized into a form suitable in a iron-making furnace such as a blast furnace, electric furnace, direct-reducing furnace, etc. Furthermore, the iron oxide can be utilized for raw materials of reduced iron powder, pigment, or magnetic material.

Another object of the present invention is to obtain simutlaneously highly purified ammonium salt which is suitable for a fertilizer.

Other objects and features of the present invention will become apparent from the following description given in conjunction with the accompanying drawings.

The accompanying drawings show a block diagram and a diagrammatical illustration of the apparatus required for carrying out the process of the said invention in the instant where treatment of waste pickling liquor, consistin gof an aqueous solution of ferrous sulfate and free sulfuric acid, is considered.

Figure 2:
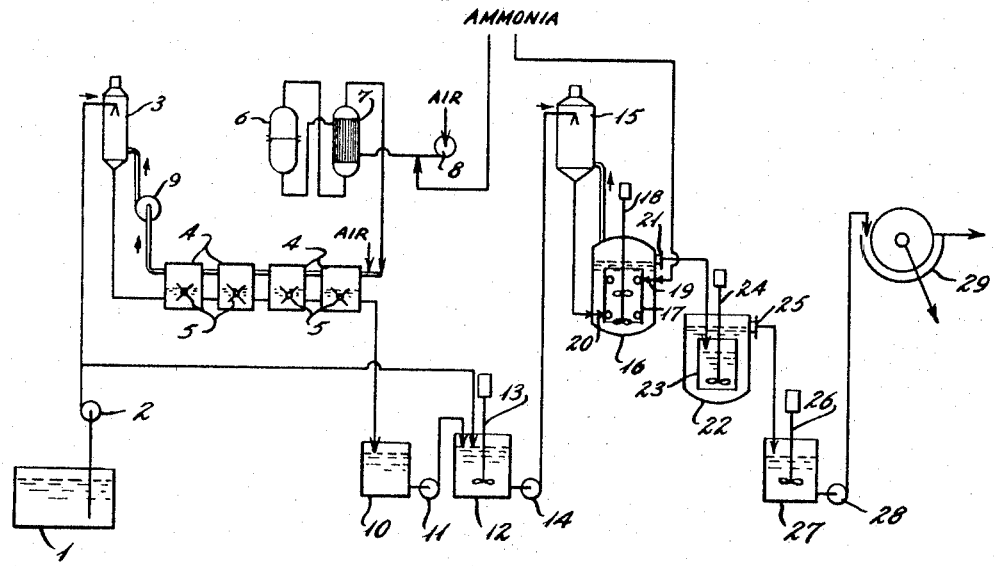

FIG. 1 is a block diagram representing the process of recovering iron oxide and ammonia sulfate mother liquor from waste pickling liquor and ammonia; and FIG. 2 is a diagrammatical illustration of the apparatus used in the system.

According to our invention, the process operating on a simple and continuous basis, is comprised of the following four stages.

In the first stage, the ferrous salt in an aqueous solution in which free acid is present is oxidized into a ferric salt by air using a catalyst, $NO_2$ gas.

In the second stage, the ferrous salt and ferric salt are mixed at an atomic ratio of ferrous iron to ferric iron of 1:2. Actually, however, the ratio may be in the range between 2:3 and 1:4.

In the third stage, ammonia gas is first fed into the mixture to neutralize it so that iron oxide and an ammonium salt may be formed. After this step, the neutralized slurry may be agitated mechanically so as to decrease considerably the amount of ferrous ion remaining therein.

In the last stage, the mother liquor of the ammonium salt is separated from the iron oxide by a continuous vacuum-filtering process. Ammonium sulfate is recovered from the mother liquor thus separated by a standard process. Likewise, the iron oxide is dried if necessary.

The process of our invention may be clearly understood from FIG. 1. The details will be given in the order of the process, referring to the system apparatus in the drawing.

The waste pickling liquor pumped from the liquor tank 1 by the pump 2 is divided into two portions. One portion passes through the absorber 3 in which Raschig rings are filled and enters the oxidizing tanks 4 having wtaer wheel-type agitators 5 whose horizontal shafts turn at right angles to the flow of liquor.

$NO_2$ gas, a catalyst used to oxidize ferrous iron, is generated as follows. A small amount of ammonia gas is mixed with air fed from the blower 8 at a ratio of approximately 1:10. This mixture is preheated by the heat exchanger 7 and is then oxidized on the surface of the platinum or platinum-rhodium catalyst in the ammonia oxidizer 6 yielding NO. With a decrease of temperature, the NO undergoes further reaction to yield $NO_2$.

$$4NH_3 + 5O_2 \rightarrow 4NO + 6H_2O$$
$$NO + \tfrac{1}{2}O_2 \rightarrow NO_2$$

($NO_2$ may also be obtained by treating $NaNO_2$ with sulfuric acid by means of a method other than the above mentioned method.) $NO_2$ gas and air are introduced into the oxidizing tanks 4 by the exhauster 9 and are agitated violently by the agitators 5.

The ferrous iron in the liquor is oxidized into ferric iron in the following manner. In the oxidizing tank, a part of NO reacts with $Fe^{++}$ in the liquor to be $Fe(NO)^{++}$, and the other part turns into $NO_2$ in the vapor phase. As compared with $Fe^{++}$, $Fe(NO)^{++}$ in the liquor is easily oxidized, while the $NO_2$ generated in the vapor phase has much higher oxidizing power than the oxygen in the air. The $Fe(NO)^{+++}$ produced by the resultant oxidation in the liquor reacts with $Fe^{++}$ to yield $Fe^{+++}$ together with the further production of $Fe(NO)^{++}$, and the NO from which oxygen has been disassociated is oxidized again into $NO_2$. These reactions are repeated on a cyclic basis. Therefore, in a totally enclosed tank, $Fe^{++}$ can be continuously converted into $Fe^{+++}$ in a short time by using $NO_2$ as a catalyst.

These reactions are represented in simplified equations as follows:

(1) $NO + \tfrac{1}{2}O_2 \rightleftharpoons NO_2$
(2) $Fe^{++} + NO \rightleftharpoons Fe(NO)^{++}$
(3) $2Fe(NO)^{++} + 2H^+ + NO_2 \rightarrow 2Fe(NO)^{+++} + H_2O + NO$
(4) $2Fe(NO)^{++} + 2H^+ + \tfrac{1}{2}O_2 \rightarrow 2Fe(NO)^{+++} + H_2O$
(5) $Fe(NO)^{+++} + Fe^{++} \rightarrow Fe(NO)^{++} + Fe^{+++}$ In an oxidizing tank designed to allow sufficient oxidation of NO in the vapor phase, resolution of $NO_2$ into the liquid phase and oxidation of $Fe(NO)^{++}$ in the liquid phase, complete oxidation is feasible in about 30 minutes by adding a catalyst of $NO_2$ in a quantity about $\tfrac{1}{30}$ that of ferrous ions in a mol ratio.

The mixture of gas which has not reacted and inactive gas is fed into the absorber 3 by means of the exhauster 9. The inactive gas is then discharged into the air after the residual catalytic $NO_2$ is absorbed into fresh waste pickling liquor.

The waste pickling liquor having been oxidized comes from the oxidizing tanks 4 and is kept in the holding tank 10 for some time. It is then sent by the pump 11 into the mixing tank 12 containing a simple mixer 13. In the mixing tank 12, fresh waste pickling liquor branched from the raw liquor tank 1 is mixed with oxidized waste pickling liquor until the atomic ratio of ferrous iron to ferric iron is 1:2. The waste pickling liquor thus mixed is fed into the neutralizer 16 through the absorber 15 by the pump 14.

The oxidizing time is relatively a short period, so variations in the constituents of the oxidized solution may be disregarded. Therefore, two solutions may be mixed continuously within the limits of the volume ratio. (The mixing ratio of the oxidized solution and the unoxidized waste liquor is about 3:7 of volume, but said ratio may be in the range of from 2:3 to 1:4.) Regarding the mixing ratio iron dissolved in the neutralized slurry will increase as ferrous iron increases; the settling speed of the neutralized slurry will decrease as ferrous iron decreases.

The neutralizing tank 16 is a normal pressure enclosed type tank which is provided with an internal cylinder 17 whose diameter and height are in the ratio of 1/2.4 to 1/3.2 and 1/1.7 to 1/2.5, respectively, to those of the tank. This provides good circulation within the tank and forms a proper neutralization zone. In the cylinder is an agitator 18 having two propellers designed to rotate to produce downward currents. It provides more than two circulation cycles per minute. At the upper part of the cylinder is the ammonia inlet 19. Under this are arranged one propeller of the agitator 18, the mixed waste pickling liquor inlet 20, and the other propeller, in descending order. This order may be changed.

In the neutralizer, the mixed waste pickling liquor turns into a slurry of ammonium sulfate solution and iron oxide by virtue of the introduction of ammonia gas into the tank at 19. That is:

$$H_2SO_4 + 2NH_3 \rightarrow (NH_4)_2SO_4$$
$$FeSO_4 + Fe_2(SO_4)_3 + 8NH_3 + 4H_2O \rightarrow Fe_3O_4 + 4(NH_4)_2SO_4$$

The ammonia escaping together with steam during neutralization is captured by the mixed waste pickling liquor in the absorber 15. The neutralized slurry runs into the aging tank 22 through the overflow port 21 after an average stay of more than 2 hours.

In these reactions it is desirable to raise the temperature, but the boiling point can be satisfactorily maintained by exothermic reactions during continuous operation. Also, the initial purpose can be accomplished even at normal temperatures immediately after the system is started, though there seems a slight difference in the waste content of the iron oxide cake after being filtered. A pH of above 7 is enough for the settlement of the iron in the liquor, but the best level may be about 7.5 in consideration of the fact that an excessively low pH value will be dangerous and that having excess ammonia is a loss.

The aging tank 22 has a capacity between ½ to equal that of the neutralizing tank. It is either an open tank or a normal pressure enclosed-type tank allowing air to be introduced into its surface or interior. It has an internal cylinder 23 of the same proportional dimensions as the neutralizing tank. The agitator 24 averages 10 circulation cycles per minute. The slurry whose iron content reaches 10 p.p.m. or less during an average stay of more than one hour in the aging tank runs from the overflow port 25 into the collection tank 27 equipped with an agitator 26, and then is fed to the vacuum filter 29 by the pump 28. When it is necessary to decrease the temperature of the slurry from its boiling point because of the subsequent continually acting vacuum filter, the slurry may be cooled in the aging tank. Also, where liquid ammonia is used as raw material, the slurry may be cooled with water, and this leads to advantageous application of the heat from the slurry for evaporation heat of the liquid ammonia.

Most suitable is an ordinary type continuous vacuum drum filter for filtering the slurry, but better filtering or separation may be realized by using other filters, settlers, magnetic separators, or their combinations.

We have verified our invention through the following tests:

(1) A test of the first stage of the oxidation process was made by using waste pickling liquor containing 168 g./litre of $FeSO_4$ and 147 g./litre of $H_2SO_4$. 140 litres of liquor was put in a 360 litre tank at a temperature of 60 to 75° C. and $NO_2$ and air were sealed therein at a normal pressure. The test was performed both at an $NO_2/Fe^{++}$ mol ratio of 1/12.5 and 1/25. The whole system was agitated while supplying pure oxygen to replace the consumed oxygen and the relationship between the percentages of ferric ion and oxidation period was measured by using the batch system. The results are shown in Table 1.

TABLE 1.—PERCENTAGE OF $FE^{+++}$/TOTAL FE AS A FUNCTION OF OXIDATION PERIOD

| Mols ratio | Period (min.) | | | | |
|---|---|---|---|---|---|
| | 5 | 10 | 15 | 20 | 30 |
| 1/12.5 | 60 | 93 | 98 | | |
| 1/25 | 31 | 61 | | 87 | 97 |

By using a continuous system, an additional test revealed that the same results as listed above could be obtained by feeding catalyst gas and air in the counter-direction as the flow of the liquid.

(2) The mixing process of the second stage was tested by using the liquor mixed at a volume ratio only.

(3) the neutralization process was examined as a function of the mixing ratio of ferrous iron and ferric iron, the pH value during neutralization, the stay time in the aging tank, and the condition for agitation. In this test, a neutralizing tank of the previously referred dimensions and construction and having a capacity of 200 litres to the overflow level was employed. The test also used partially oxidized and partially non-oxidized waste pickling liquor containing 223 g./litre $FeSO_4$ and 132 g./litre $H_2SO_4$ (Fe 82 g./litre and total $SO_4$ 270 g./litre). The specimens were collected and analyzed after the temperature reached the neighborhood of its boiling point and the system had entered full operation.

The mixing ratio, pH value, stay period, and condition for agitation in relation to the resolved iron in the liquor are shown in Tables 2, 3, 4, and 5, respectively. The fixed conditions are given below each table.

TABLE 2.—IRON REMAINING IN LIQUOR AS A FUNCTION OF RATIO OF $Fe^{++}$ TO $Fe^{+++}$

| $Fe^{++}$ | $Fe^{+++}$ | Iron remaining in liquor (g./l.) |
|---|---|---|
| 1 | 4 | 0.12 |
| 3 | 7 | 0.12 |
| 1 | 2 | 0.32 |
| 2 | 3 | 2.80 |
| 1 | 1 | 10.40 | pH: 7.5.
Liquor feed rate: 70 litre/hr. (stay 3 hr.).
Condition for agitation: 2 c.p.m. (circulations per minute).

TABLE 3.—Iron remaining in liquor as a function of pH at neutralization

| pH at neutralization: | Iron remaining in liquor (g./l.) |
|---|---|
| 6.4 | 1.15 |
| 6.8 | 0.35 |
| 7.2 | 0.14 |
| 8.6 | 0.12 |

Mixing ratio: 3:7.
Feed rate: 70 litre/hr. (stay 3 hr.).
Condition for agitation: 2 c.p.m.

TABLE 4.—Iron remaining in liquor as a function of stay period

| Stay period (hr.): | Iron remaining in liquor (g./l.) |
|---|---|
| 1 | [1]3.60 |
| 2 | 0.17 |
| 3 | 0.13 |
| 4 | 0.12 |

[1] It is difficult to keep the pH value at 7.0 or higher as the stay time becomes shorter.

pH: 7.5.
Mixing ratio: 3:7.
Condition for agitation: 2 c.p.m.

TABLE 5.—Iron remaining in liquor as a function of mixing condition

| Circulation (c.p.m.): | Iron remaining in liquor (g./l.) |
|---|---|
| 0 (not stirred) | 1.04 |
| 1.2 | 0.17 |
| 2.0 | 0.14 |
| 3.0 | 0.15 | pH: 7.5.
Mixing ratio: 3:7.
Feed rate: 70 litre/hr. (stay 3 hr.).

(4) The test for the aging process was made aimed not at the aging of the precipitation but at the complete separation of the very small quantity of iron remaining in the mother liquor. Assuming that it would be easiest to attain the purpose by air oxidation, tests were performed by either blowing air into the slurry or by mechanically stirring it. Contrary to our expectations, better results were obtained by mechanical agitation, which can more easily be obtained by a uniform stay period in continuous processing. The results gained from continuous aging tests through mechanical agitation in a 200-litre aging tank are shown in Table 6.

TABLE 6.—IRON REMAINING IN LIQUOR AS A FUNCTION OF AGING TIME

| Iron remaining in mother liquor (g./l.) | Period (min.) | | | | |
|---|---|---|---|---|---|
| | 5 | 10 | 18 | 30 | 45 |
| 0.18 | 0.14 | 0.07 | Trace | | |
| 0.33 | 0.30 | 0.24 | 0.07 | Trace | |
| 0.56 | 0.52 | | 0.28 | 0.05 | Trace | pH: 7.5.
Temperature: 60–75° C.
Condition for agitation: 10 c.p.m.

(5) Concerning the last stage, ordinary vacuum filtering may be sufficient. An example of the tests is given here. The test was conducted by using a nylon cloth. The liquor contained cake of 11 wt. percent concentration. After one minute absorption and 3-minute dehydration at the temperature of 60° C., the cake thickness was 3 mm. yielding a cake forming rate and filtering speed of 300 kg./m.$^2$ hr. The residual mother liquor in the cake was 31% of the wet cake. When new nylon cloth was used, solids in the amount of 0.5 g./litre were found in the filtrate. With distillation and concentration of the liquid from which solids have been completely removed, a pure white crystalline ammonium sulfate containing more than 21.1% nitrogen can be obtained from the thus concentrated liquid.

Although this invention has been described as applied to the treatment of waste sulfate pickling liquor, it will be understood that it applies equally as well to the treatment of waste chloride pickling liquor, in which case the products of the reaction will be ammonium chloride and an iron oxide.

The above descriptions of the apparatus and of typical runs are given as examples only and are not to be construed as limiting the scope of the invention since various modifications may be made within the scope of the following claims without departing from the spirit of our invention.

We claim:

1. A method of producing pure ammonium salt and ferroso-ferric oxide from waste pickling liquor comprising the following steps:
    oxidizing about two-thirds of the waste pickling liquor containing an aqueous solution of (1) a free acid selected from the group consisting of sulfuric and hydrochloric acids and (2) ferrous salts thereof using free oxygen and $NO_2$ gas as a catalyst;
    mixing said oxidized aqueous solution and the remaining about one-third amount of unoxidized waste pickling liquor so as to provide a ratio of about 3:7 of ferrous and ferric salts;
    neutralizing said mixed aqueous solution with ammonia gas in a neutralizer to produce a slurry containing ferroso-ferric oxide and ammonium salts of said acids; and
    separating ferroso-ferric oxide and ammonium salts of said acid from said neutralized slurry.

2. A method according to claim 1 wherein said $NO_2$ gas catalyst employed in said oxidizing step is produced by oxidizing ammonia gas with air.

3. A method according to claim 2 wherein a catalyst selected from the group consisting of platinum and platinum rhodium is used for the manufacture of $NO_2$ gas.

4. A method according to claim 1 wherein said $NO_2$ gas catalyst used for oxidizing ferrous ion in said oxidizing step is produced by subjecting $NaNO_2$ to the action of sulfuric acid.

5. A method according to claim 1 wherein an amount of said catalyst used in said oxidizing step is at least one-thirtieth the amount of ferrous ion in a mol ratio.

6. A method according to claim 1 wherein an excessive amount of unreacted $NO_2$ gas catalyst together with an inert gas evolved in said oxidizing step is absorbed into said aqueous solution to be oxidized prior to entering into said oxidizer.

7. A method according to claim 1 wherein said oxidized aqueous solution is mixed with the remaining unoxidized waste liquor amounting to about one-third of said whole waste liquor so as to provide a ratio of ferrous and ferric salts in the range of from 2:3 to 1:4.

8. A method according to claim 1 wherein the pH value of said slurry is adjusted to more than 7.0 in said neutralizing step.

9. A method according to claim 1 wherein said neutralized slurry stays for an average period of more than two hours during said neutralizing step.

10. A method according to claim 1 wherein an excessive amount of unreacted ammonia gas together with steam evolved from said mixed solution in said neutralizing step is absorbed into said mixed solution prior to entering into said neutralizer.

11. A method according to claim 1 wherein said slurry is subjected to agitation for a period of more than thirty minutes after said neutralizing step.

References Cited

UNITED STATES PATENTS

| | | | |
|---|---|---|---|
| 2,095,074 | 10/1937 | Muus | 23—119 |
| 2,419,240 | 4/1947 | Wilson | 23—119 |
| 2,511,307 | 6/1950 | Tiddy et al. | 23—119 |
| 2,529,874 | 11/1950 | Hoak | 23—200 |
| 2,467,446 | 4/1949 | Smithells | 23—162 |
| 2,773,743 | 12/1956 | Fackert | 23—200 |
| 2,011,307 | 8/1935 | Peski | 23—119 |

HERBERT T. CARTER, *Primary Examiner.*

U.S. Cl. X.R.

23—119, 200